United States Patent
Urushibata

(10) Patent No.: US 7,922,198 B2
(45) Date of Patent: Apr. 12, 2011

(54) AIRBAG AND METHOD OF MANUFACTURE THEREOF

(75) Inventor: Akito Urushibata, Shizuoka (JP)

(73) Assignee: Nihon Plast Co., Ltd., Shizuoka-Ken (JP)

( * ) Notice: Subject to any disclaimer, the term of this patent is extended or adjusted under 35 U.S.C. 154(b) by 274 days.

(21) Appl. No.: 12/236,049

(22) Filed: Sep. 23, 2008

(65) Prior Publication Data

US 2009/0079166 A1 Mar. 26, 2009

(30) Foreign Application Priority Data

Sep. 25, 2007 (JP) ................................. 2007-248018

(51) Int. Cl.
*B60R 21/231* (2011.01)
*B60R 21/205* (2011.01)

(52) U.S. Cl. ................... 280/743.1; 280/728.1; 280/732

(58) Field of Classification Search ............... 280/728.1, 280/732, 743.1; 493/243
See application file for complete search history.

(56) References Cited

U.S. PATENT DOCUMENTS

| | | | |
|---|---|---|---|
| 3,792,873 A * | 2/1974 | Buchner et al. ............ | 280/743.1 |
| 3,810,654 A * | 5/1974 | DeBano et al. ............ | 280/728.1 |
| 5,316,337 A | 5/1994 | Yamaji et al. | |
| 5,529,340 A | 6/1996 | Fairbanks | |
| 5,855,393 A | 1/1999 | Keshavaraj | |
| 5,865,467 A * | 2/1999 | Bito et al. .................. | 280/743.1 |
| 5,957,486 A * | 9/1999 | Taguchi et al. ............. | 280/729 |
| 5,975,571 A * | 11/1999 | Ford et al. .................. | 280/743.1 |
| 6,019,390 A * | 2/2000 | Keshavaraj ................ | 280/743.1 |
| 6,129,382 A | 10/2000 | Tonooka | |
| 6,168,203 B1 * | 1/2001 | Amamori .................... | 280/743.1 |
| 6,832,779 B2 * | 12/2004 | Tajima et al. ............... | 280/743.1 |

FOREIGN PATENT DOCUMENTS

JP 06-270756 9/1994

* cited by examiner

*Primary Examiner* — Ruth Ilan
*Assistant Examiner* — Laura Freedman
(74) *Attorney, Agent, or Firm* — NDQ&M Watchstone LLP

(57) ABSTRACT

An airbag includes a circumferential plane, a margin, a receiving plane and a second seam line. The circumferential plane is formed by being seamed to form a first seam line from its base end to its farthest end and has a closed cross section. The margin for the first seam line is provided on the circumferential plane. The receiving plane extends integrally from the circumferential panel and receives a passenger at an impact. The circumferential plane and the receiving plane are seamed together to form the second seam line. The second seam line crosses the first seam line and goes across the margin in a width direction of the margin. According to the airbag, its manufacturing efficiency can be improved.

2 Claims, 9 Drawing Sheets

AIRBAG AND METHOD OF MANUFACTURE THEREOF

BACKGROUND OF THE INVENTION

1. Field of the Invention

The present invention relates to an airbag that is to be inflated to protect a passenger at a vehicle impact and a manufacturing method of the airbag.

2. Description of the Related Art

For example, an airbag made by an airbag base fabric was disclosed in Japanese Patent Application Laid-Open No. Hei 6-270756. The airbag fabric includes a bottom panel for receiving a passenger, a pair of upper and lower panels integrally extending from upper and lower edges of the bottom panel, and a pair of side panels integrally extending form side edges of the bottom panel and the upper and lower panels. Each of the side panel is composed of an upper side panel, a lower side panel and a bottom side panel. The upper side panel, the lower side panel and the bottom side panel are sewn each other along edges of two adjacent side panels.

In sewing of the air bag, the lower panel and the pair of lower side panels are folded so as to make the lower panel lapped on the bottom panel, first. And then lapped edges of the lower side panels and the bottom side panels are sewn. Next, unsewn areas of the lower panel and the lower side panels are folded back and then the upper panel and the pair of upper side panels are folded so as to make the upper panel lapped on the unsewn area of the lower panel. And then lapped edges of the upper side panels and the bottom side panels are sewn. Next, the bottom panel and the bottom side panels are folded back so as to make the bottom panel half folded. And then lapped edges of the lower side panels and the upper side panels are sewn. In this manner, the airbag is made through sewing processes.

SUMMARY OF THE INVENTION

However, according to the above-mentioned airbag, single process set of lapping the panels and sewing them must be repeated three times in order to sewing the lapped edges of the side panels. Therefore, since sewing processes must take a lot of tasks, it is hard to improve manufacturing efficiency.

Therefore, an object of the present invention is to provide an airbag that can improve manufacturing efficiency and a manufacturing method of the airbag.

A first aspect of the present invention provides an airbag that includes a circumferential plane, a margin, a receiving plane and a second seam line. The circumferential plane is formed by being seamed to form a first seam line from its base end to its farthest end and has a closed cross section. The margin for the first seam line is provided on the circumferential plane. The receiving plane extends integrally from the circumferential panel and receives a passenger at an impact. The circumferential plane and the receiving plane are seamed together to form the second seam line. The second seam line crosses the first seam line and goes across the margin in a width direction of the margin.

In the first aspect of the present invention, the second seam line for seaming the receiving plane and the circumferential plane together crosses the first seam line provided on the circumferential plane. In addition, the second seam line crosses the first seam line and goes across the margin in a width direction of the margin. Therefore, seamed portions of the circumferential plane and the receiving plane located on both sides of the margin can be seamed to form the second seam line continuously. As a result, seaming processes of the airbag can be made simplified and manufacturing efficiency of the airbag can be improved.

It is preferable that the airbag further includes a main body including the circumferential plane, the margin, the receiving plane and the second seam line. Here, the main body is made by seaming an airbag fabric, which includes a pair of circumferential segments for forming the circumferential plane and a pair of receiving segments for forming the receiving plane. In addition, the airbag fabric includes a pair of seamed lines which are lapped together and extend along the first and second seam lines when being spread into a flat state. Further, the airbag fabric, in a state where the pair of seamed lines has been lapped each other, includes a double-layered circumferential-panel structure formed with the lapped circumferential segments and a double-layered receiving-panel structure adjacent to the circumferential-panel structure and formed with the lapped receiving segments. Each of the seamed lines includes a first seamed line provided on the circumferential-panel structure (the lapped circumferential segments are seamed along the first seamed line to form the first seam line), a pair of second seamed lines provided on the circumferential-panel structure and crossing the first seamed line (one of the circumferential segments and one of the receiving segments are seamed along one of the second seamed lines to form the second seam line, and another of the circumferential segments and another of the receiving segments are seamed along another of the second seamed lines to form the second seam line), and a pair of third seamed lines provided on the receiving-panel structure and crossing the pair of second seamed lines, respectively (the pair of third seamed lines is lapped onto the pair of second seamed lines). Furthermore, in case where points A to N are defined as described below, the first seamed line and the pair of second seamed lines are located on or outside a circumference of a hexagon AIKLJB, and points M and N are located outside the hexagon AIKLJB.

point A: a cross point of one set of the lapped second seamed lines and one set of the lapped third seamed lines point B: a cross point of another set of the lapped second seamed lines and another set of the lapped third seamed lines point C: a cross point of the one set of the lapped third seamed lines and a virtual axial line extending along a folding edge of the receiving-panel structure point D: a cross point of the other set of the lapped third seamed lines and the virtual axial line point E: a cross point of a segment CD and a straight line passing over the point A and perpendicular to a segment AB point F: a cross point of the segment CD and a straight line passing over the point B and perpendicular to the segment AB point G: a cross point of the segment CD and a straight line obtained by rotating a straight line AE around the point A by $\alpha$ degree point H: a cross point of the segment CD and a straight line obtained by rotating a straight line BF around the point B by $\beta$ degree point I: a point being on an opposite side of the point B with respect to the straight line AE and providing a segment with the point A having the same length as a segment AG point J: a point being on an opposite side of the point A with respect to the straight line BF and providing a segment with the point B having the same length as a segment BH point K: a point to meet a following formula (I) on a straight line obtained by rotating the straight line AE around the point A by $\gamma$ degree $$(AI)^2 \times (\cos 2\alpha) = (AK)^2 - (IK)^2 + 2 \times (AI) \times (AK) \times (\sin \alpha) \times (\sin \gamma) \qquad (I)$$

point L: a point to meet a following formula (II) on a straight line obtained by rotating the straight line BF around the point B by δ degree $$(BJ)^2 \times (\cos 2\beta) = (BL)^2 - (JL)^2 + 2 \times (BJ) \times (BL) \times (\sin \beta) \times (\sin \delta) \qquad (II)$$

point M: a cross point of the lapped first seamed lines and the one set of the lapped second seamed lines point N: a cross point of the lapped first seamed lines and the other set of the lapped second seamed lines In this configuration, the first seamed line and the pair of second seamed lines are located on or outside the circumference of the hexagon AIKLJB, and the points M and N are located outside the hexagon AIKLJB. According to this configuration, the pair of circumferential segments is pulled opposingly so as to be separated each other from a state in which the lapped circumferential segments have been seamed along the lapped first seamed lines to form the first seam line. And the pair of receiving segments is made laid on the same flat plane so as to lap the segments AI and BJ provided on the circumferential segments onto the segments AG and BH provided on the receiving segments, respectively. Consequently, two triangles AKI and two triangles BLJ are formed. Here, the points M and N are lapped onto the points C and D, respectively. Namely, since outer segments of the circumferential segments outside the triangles AKI and BLJ can be lapped onto the receiving segments being developed flat, the circumferential segments and the receiving segments can be seamed together to form the second seam line on a flat plane. As a result, seaming process of the circumferential segments and the receiving segments to form the second seam line can be done easily and thereby manufacturing efficiency of the airbag can be further improved.

A second aspect of the present invention provides a manufacturing method of an airbag manufactured by seaming an airbag fabric along first and second seam lines, which includes a pair of circumferential segments for forming a circumferential plane and a pair of receiving segments for forming receiving plane. Here, the airbag fabric includes a pair of to-be-seamed lines which are to be lapped together. In addition, the airbag fabric, in a state where the pair of seamed lines has been lapped each other, includes a double-layered circumferential-panel structure formed with the lapped circumferential segments and a double-layered receiving-panel structure adjacent to the circumferential-panel structure and formed with the lapped receiving segments. Furthermore, each of the to-be-seamed lines includes a first to-be-seamed line provided on the circumferential-panel structure (the lapped circumferential segments are seamed along the first seamed line to form the first seam line), a pair of second to-be-seamed lines provided on the circumferential-panel structure and crossing the first to-be-seamed line (one of the circumferential segments and one of the receiving segments are to be seamed along one of the second to-be-seamed lines to form the second seam line, and another of the circumferential segments and another of the receiving segments are to be seamed along another of the second to-be-seamed lines to form the second seam line), and a pair of third to-be-seamed lines provided on the receiving-panel structure and crossing the pair of second to-be-seamed lines, respectively (the pair of third to-be-seamed lines is to be lapped onto the pair of second to-be-seamed lines). The manufacturing method includes a first step for folding back the airbag fabric so as to lap the pair of to-be-seamed lines each other, a second step for seaming one of the circumferential segments and another of the circumferential segments along the lapped first to-be-seamed lines to form the first seam line, a third step for pulling away the one of the circumferential segments and the other of the circumferential segments so as to make the pair of receiving segments laid on a same flat plane, and lapping the second to-be-seamed line on the one of the circumferential segments onto the third to-be-seamed line on the one of the receiving segments and lapping the second to-be-seamed line on the other of the circumferential segments onto the third to-be-seamed line on the other of the receiving segments, and a fourth step for seaming edges of the lapped circumferential and receiving segments along the second to-be-seamed lines to form the second seam line so as to cross the first seam line from cross points of the second to-be-seamed lines on the one of the circumferential segments to other cross points of the second to-be-seamed lines on the other of the circumferential segments, respectively.

According to the second aspect of the present invention, the airbag can be manufactured by repeating single process set of folding back the airbag fabric and seaming the lapped to-be-seamed lines only twice. As a result, manufacturing efficiency of the airbag can be improved.

DETAILED DESCRIPTION OF THE EMBODIMENT

Hereinafter, embodiments according to the present invention will be described in detail with reference to drawings.

First Embodiment

An airbag 1 in the present embodiment is installed within an instrument panel (not shown) in front of a passenger seat of an automobile. The airbag 1 is to be inflated due to gas fulfillment into its inside at an car impact or the like in order to restraint a passenger moving forward and then reduce an impact applying to the passenger. Note that seam lines in the airbag 1 of the present embodiment are made by sewing with threads.

Figure 1:
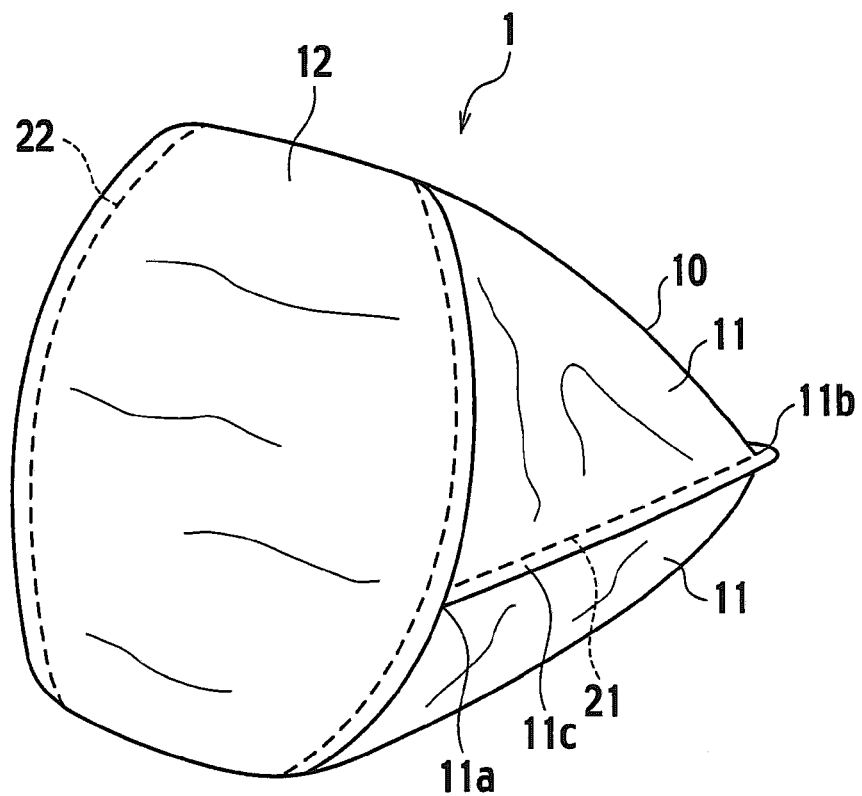
FIG. 1 is a perspective view of an airbag in a first embodiment according to the present invention showing a side of a receiving panel of the airbag.

As shown in FIG. 1, the airbag 1 includes an airbag main body (main element) 10. The airbag main body 10 is composed of a circumferential panel 11 including an upper panel, a lower panel and side panels and a receiving panel 12 continuing with the circumferential panel 11 for receiving a passenger at a deployment of the airbag 1.

The circumferential panel 11 has a closed cross section with being sewn with a first thread 21 extending from its farthest end 11a to its base end 11b. In the present embodiment, an after-mentioned pair of circumferential segments 31 of an airbag fabric 30 is sewn together with the first thread 21 at both sides on the circumferential panel 11. A margin 11c for sewing with the first thread 21 is provided outside the first thread 21.

The receiving panel 12 continues from the farthest end 11a by sewing along an outer circumferential edge of the receiving panel 12 and the farthest end 11a using second threads 22.

Figure 2:
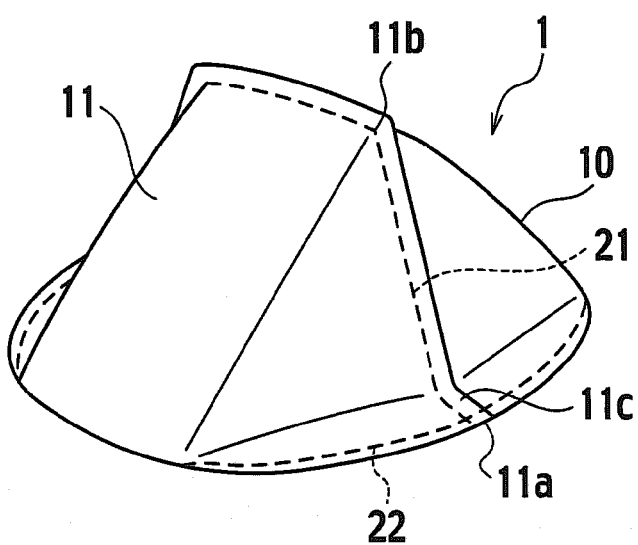
FIG. 2 is a perspective view of the airbag in the first embodiment showing a base end side of the airbag.

As shown in FIG. 2, the circumferential panel 11 and the receiving panel 12 are sewn together with the second threads 22 in the present embodiment. Here, each of the second threads 22 crosses the first thread 21 and goes across the margin 11c on the circumferential panel 11 in a width direction of the margin 11c.

In other words, each of the second threads 22 continuously runs over the first thread 21 and sewn lines continuously extending on both sides (upper side and lower side) of the margin 11c. The circumferential panel 11 and the receiving panel 12 are sewn together along the sewn lines with the second threads 22.

Note that the airbag 1 is reversed entirely through an after-mentioned opening 71 after sewing an airbag fabric 30 and used in a state in which sewn edges are hidden within the airbag 1. However, the airbag 1 before being reversed is shown in FIGS. 1 and 2 for easily understanding.

Here, the airbag main body 10 in the present embodiment is made by sewing one sheet of the airbag fabric 30 so as to form a bag shape.

Figure 3:
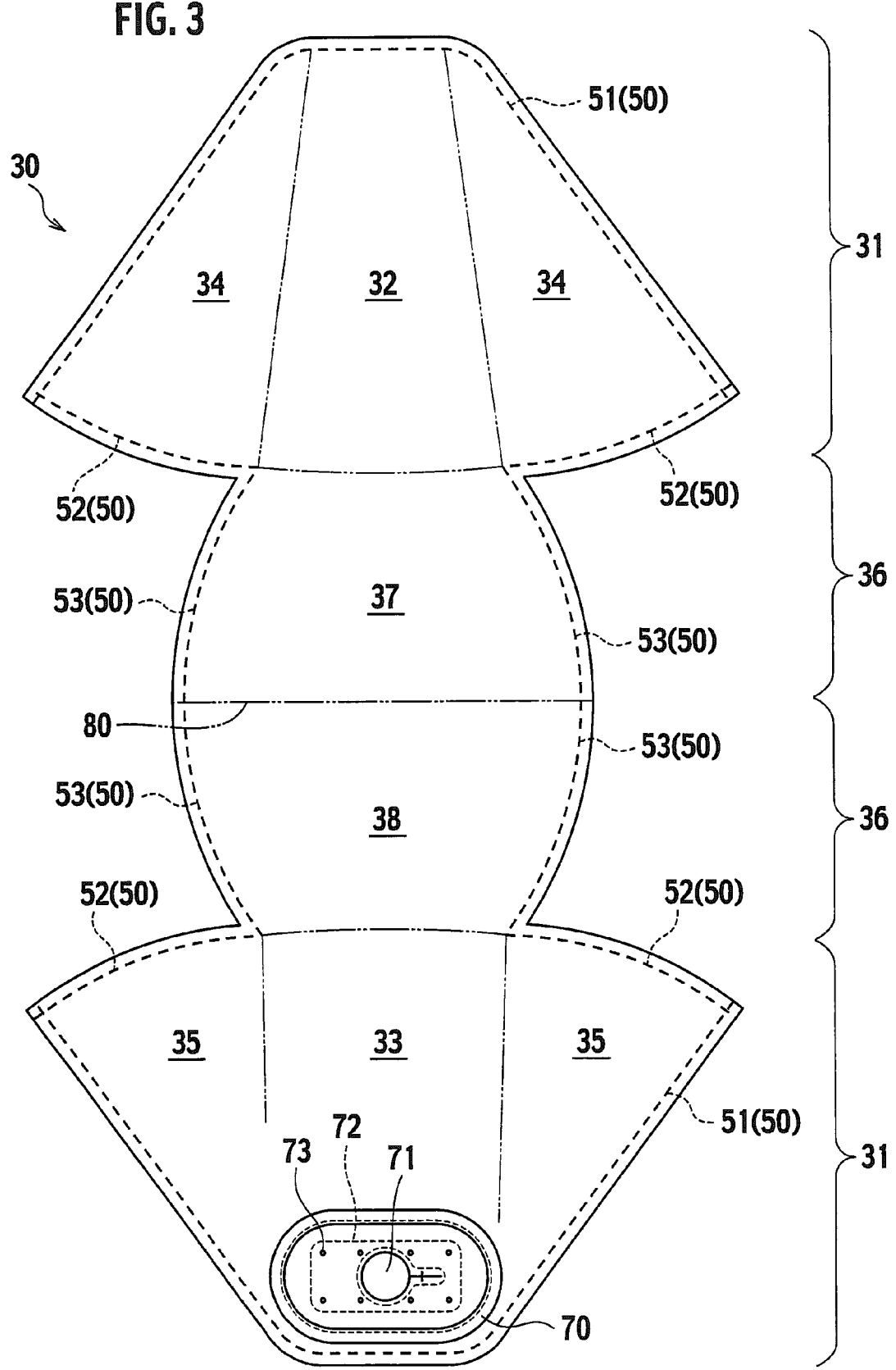
FIG. 3 is a development view of the airbag in the first embodiment.

FIG. 3 is a plan view of the airbag 1 developed into a flat state. The airbag fabric 30 shown in FIG. 3 is obtained by removing the first thread 21 and the second threads 22 from the bag-shaped airbag main body 10 shown in FIG. 1 and then spreading it into a flat state.

The airbag fabric 30 includes the pair of circumferential segments 31 for forming the circumferential panel 11 and a pair of receiving segments 36 for forming the receiving panel 12.

One of the circumferential segments 31 includes an almost trapezoidal circumferential upper area 32 and almost fan-shaped circumferential upper side areas 34. The circumferential upper area 32 is at the almost center of the one of the circumferential segments 31 and forms an upper plane of the airbag main body 10. The circumferential upper side areas 34 extend integrally from both side edges of the circumferential upper area 32 and form upper portions of side planes of the airbag main body 10. Another of the circumferential segments 31 includes an almost trapezoidal circumferential lower area 33 and almost fan-shaped circumferential lower side areas 35. The circumferential lower area 33 is at the almost center of the other of the circumferential segments 31 and forms a lower plane of the airbag main body 10. The circumferential lower side areas 34 extend integrally from both side edges of the circumferential lower area 33 and form lower portions of side planes of the airbag main body 10.

In the present embodiment, provided is the opening 71 for attaching an inflator (not shown) which spouts out gas into the airbag main body 10. An assist panel 70 is attached on the circumferential lower area 33 by sewing in order to reinforce a periphery around the opening 71.

The almost circular opening 71 for attaching the inflator and fixing area 72 are provided on the assist panel 70. Fixing holes 73 are provided within the fixing area 72. The airbag main body 10 is fixed onto a retainer (not shown) by inserting bolts or the like into with the fixing holes 73.

One of the receiving segments 36 includes a receiving upper area 37. The receiving upper area 37 extends integrally from the circumferential upper area 32 and forms an upper portion of the receiving panel 12 of the airbag main body 10. Another of the receiving segments 36 includes a receiving lower area 38 extending integrally from the receiving upper area 37. The receiving lower area 38 extends integrally from the circumferential lower area 33 and forms a lower portion of the receiving panel 12 of the airbag main body 10. In the present embodiment, the pair of receiving segments 36 (the receiving upper area 37 and the receiving lower area 38) has a barreled shape inflated its center outward.

As shown In FIG. 3, each of the circumferential segments 31 has a same line-symmetric shape with respect to a virtual axial line 80. In addition, each of the receiving segments 36 has a same line-symmetric shape with respect to the virtual axial line 80. Namely, the airbag fabric 30 has a line-symmetric shape with respect to the virtual axial line 80.

Furthermore in the present embodiment, the airbag fabric 30 has a pair of sewing lines 50 which are to be lapped each other. The pair of sewing lines 50 is to be sewn with the first thread 21 and the second threads 22. In other words, the pair of sewing lines 50 extends along the first thread 21 and the second threads 22 in a state where the airbag fabric 30 were developed flat.

Figure 4:
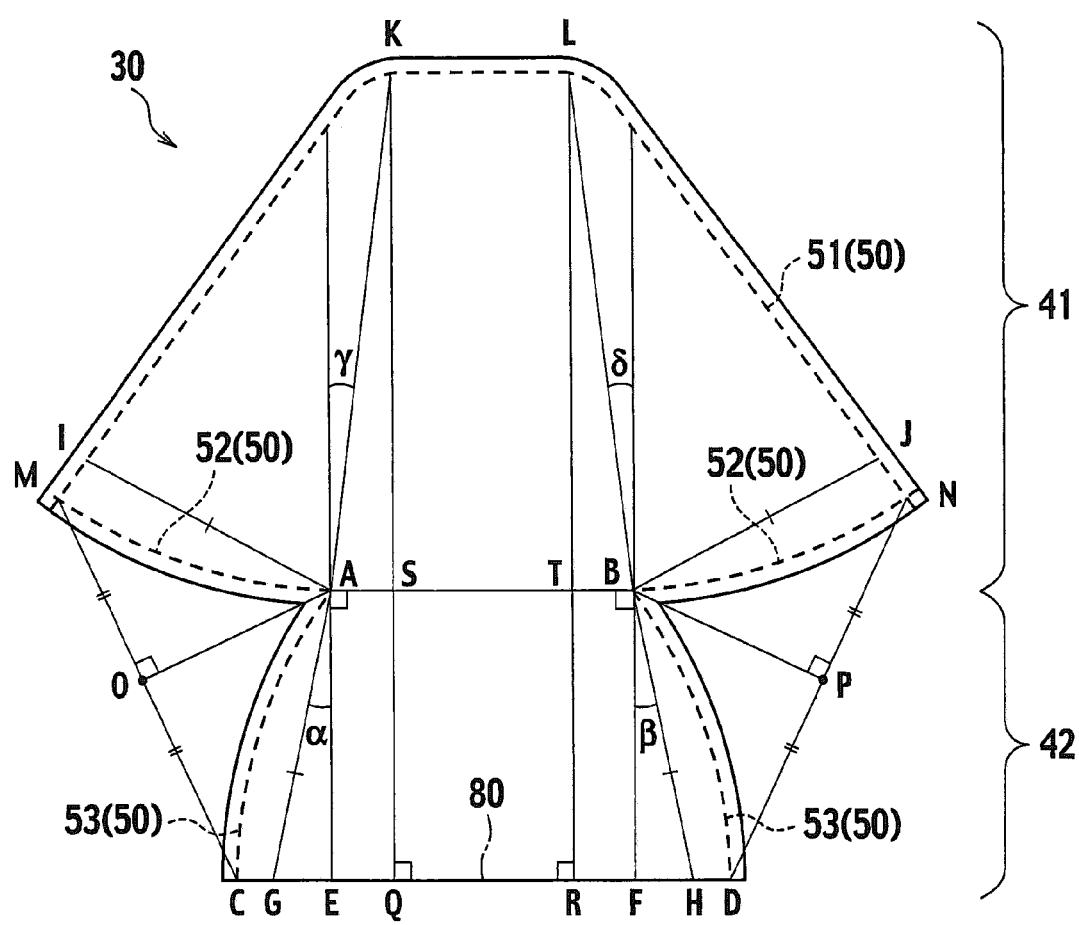
FIG. 4 is a plan view showing a fabric of the airbag in the first embodiment after folding back and then being lapped.

As shown in FIG. 4, in a state in which the sewing lines 50 are lapped each other (the airbag fabric 30 is folded along the virtual axial line 80), the airbag fabric 30 includes a double-layered circumferential-panel structure 41 and a double-layered receiving-panel structure 42 adjacent to the circumferential-panel structure 41. The circumferential-panel structure 41 is formed by lapping the pair of circumferential segments 31. The receiving-panel structure 42 is formed by lapping the pair of receiving segments 36. The virtual axial line 80 extends along a folding edge of the receiving-panel structure 42.

Here, each of the lapped sewing lines 50 includes a first sewing line 51, a pair of second sewing lines 52 and a pair of third sewing lines 53. The first sewing lines 51 are provided on the circumferential-panel structure 41. The first sewing lines 51 are sewing line along which the lapped circumferential segments 31 are sewn with the first thread 21. The second sewing lines 52 are provided on the circumferential-panel structure 41 and cross the first sewing lines 51. One set of the second sewing lines 52 is sewing lines along which the one of the circumferential segments 31 (including the circumferential upper area 32) and the one of the receiving segments 36 (including the receiving upper area 37) are sewn with the second threads 22. Another set of the second sewing lines 52 is sewing lines along which the other of the circumferential segments 31 (including the circumferential lower area 33) and the other of the receiving segments 36 (including the receiving lower area 38) are sewn with the second threads 22. The third sewing lines 53 are provided on the receiving-panel structure 42 and lapped with the second sewing lines 52. The third sewing lines 53 are sewn with the second threads 22 together with the second sewing lines 52.

Here, defined as a point A is a cross point of one set of the lapped second sewing lines 52 (left in FIG. 4) and one set of the lapped third sewing lines 53 (left in FIG. 4). Defined as a point B is a cross point of another set of the lapped second sewing lines 52 (right in FIG. 4) and another set of the lapped third sewing lines 53 (right in FIG. 4).

In addition, defined as a point C is a cross point of the one set of the lapped third sewing lines 53 and the virtual axial line 80. Defined as a point D is a cross point of the other set of the lapped third sewing lines 53 and the virtual axial line 80.

Further, defined as a point E is a cross point of a segment CD and a straight line passing over the point A and perpendicular to a segment AB. Defined as a point F is a cross point of the segment CD and a straight line passing over the point B and perpendicular to the segment AB. Defined as a point G is a cross point of the segment CD and a straight line obtained by rotating a straight line AE around the point A by α degree (≧0: clockwise in FIG. 4). Defined as a point H is a cross point of the segment CD and a straight line obtained by rotating a straight line BF around the point B by β degree (≧0: counter-clockwise in FIG. 4).

Furthermore, defined as a point I is a point which is on the opposite side of the point B with respect to the straight line AE (left in FIG. 4) and provides a segment with the point A having the same length as a segment AG. Defined as a point J is a point which is on the opposite side of the point A with respect to the straight line BF (right in FIG. 4) and provides a segment with the point B having the same length as a segment BH.

And then, defined as a point K is a point which meets a following formula (I) on a straight line obtained by rotating the straight line AE around the point A by γ degree (≧0: clockwise in FIG. 4).

$$(AI)^2 \times (\cos 2\alpha) = (AK)^2 - (IK)^2 + 2 \times (AI) \times (AK) \times (\sin \alpha) \times (\sin \gamma) \quad (I)$$

In addition, defined as a point L is a point which meets a following formula (II) on a straight line obtained by rotating the straight line BF around the point B by δ degree (≧0: counter-clockwise in FIG. 4).

$$(BJ)^2 \times (\cos 2\beta) = (BL)^2 - (JL)^2 + 2 \times (BJ) \times (BL) \times (\sin \beta) \times (\sin \delta) \quad (II)$$

Note that (AI) represents a length of a segment AI.

In addition, defined as a point M is a cross point of the lapped first sewing lines 51 and the one set of the lapped second sewing lines 52. Defined as a point N is a cross point of the lapped first sewing lines 51 and the other set of the lapped second sewing lines 52. A midpoint of a segment CM is defined as a point O. A midpoint of a segment DN is defined as a point P.

Further, defined as a point Q is a cross point of the segment CD and a straight line passing over the point K and perpendicular to the segment CD. Defined as a point R is a cross point of the segment CD and a straight line passing over the point L and perpendicular to the segment CD. A cross point of a segment KQ and the segment AB is defined as a point S. A cross point of a segment LR and the segment AB is defined as a point T. In the present embodiment, the first sewing lines 51 and the second sewing lines 52 are located on or outside a circumference of a hexagon AIKLJB. Note that the first sewing lines 51 and the second sewing lines 52 are necessarily provided on the circumferential-panel structure 41 as described above. In addition, the points M and N are located outside the circumference of the hexagon AIKLJB. Note that the points M and N are necessarily provided on the circumferential-panel structure 41.

Furthermore, the one set of the lapped second sewing lines 52 (left in FIG. 4) and the one set of the lapped third sewing lines 53 (left in FIG. 4) are line symmetrical with respect to a straight line passing over the point O and perpendicular to the segment CM (a perpendicular bisector of the segment CM). The other set of the second sewing lines 52 (right in FIG. 4) and the other set of the third sewing lines 53 (right in FIG. 4) are line symmetrical with respect to a straight line passing over the point P and perpendicular to the segment DN (a perpendicular bisector of the segment DN).

In other words, an area, which is on the same side as the point M with respect to a straight line AI, of the circumferential-panel structure 41 and an area, which is on the same side as the point C with respect to a straight line AG, of the receiving-panel structure 42 have an identical shape. An area, which is on the same side as the point N with respect to a straight line BJ, of the circumferential-panel structure 41 and an area, which is on the same side as the point B with respect to a straight line BH, of the receiving-panel structure 42 have an identical shape.

In the present embodiment having the above-described configurations, the pair of circumferential segments 31 is pulled oppositely so as to be separated each other from a state in which the lapped circumferential segments 31 have been sewn along the lapped first sewing lines 51 with the first thread 21. And then the pair of receiving segments 36 is made laid on the same flat plane so as to lap the segments AI and BJ provided on the circumferential segments 31 onto the segments AG and BH provided on the receiving segments 36, respectively. As a result, two triangles AKI and two triangles BLJ are formed (see FIGS. 7 and 8).

Here, a height of the point K (a length of a segment KQ) is defined X with respect to the triangles AKI. Following formulas (III) and (IV) must be met in order that the two triangles AKI and the two triangles BLJ are formed when the segments AI and BJ and the segments AG and BH are lapped each other, respectively.

$$(KS)^2 = (QS)^2 + X^2 \quad (III)$$

$$(KI)^2 = (GQ)^2 + X^2 \quad (IV)$$

In addition, a height of the point L (a length of a segment LR) is defined Y with respect to the triangles BLJ. Following formulas (V) and (VI) must be met.

$$(LT)^2 = (RT)^2 + Y^2 \quad (V)$$

$$(LJ)^2 = (HR)^2 + Y^2 \quad (VI)$$

Although following formulas are necessarily true with respect to the triangles AKI.

$$(KS) = (AK) \times (\cos \gamma)$$

$$(QS) = (AI) \times (\cos \alpha)$$

$$(GQ) = (AI) \times (\sin \alpha) + (AK) \times (\sin \gamma)$$

Therefore, the above-described formula (I) is introduced by substituting the above three formulas into the formulas (III) and (IV) for eliminating X and then organizing them.

Similarly, following formulas are necessarily true with respect to the triangles BLJ.

$$(LT) = (BL) \times (\cos \delta)$$

$$(RT) = (BJ) \times (\cos \beta)$$

$$(HR) = (BJ) \times (\sin \beta) + (BL) \times (\sin \delta)$$

Therefore, the above-described formula (II) is introduced by substituting the above three formulas into the formulas (V) and (VI) for eliminating Y and then organizing them.

In the present embodiment, since the points K and L meet the above formulas (I) and (II) and the first sewing lines 51 are located on or outside the hexagon AIKLJB which includes the triangles AKI and BLJ, the circumferential segments 31 can form the two triangles AKI and the two triangles BLJ without being hindered by the first thread 21.

In addition, since the one of the second sewing lines 52 (left in FIG. 4) and the one of the third sewing lines 53 (left in FIG. 4) are line symmetrical with respect to the straight line passing over the point O and perpendicular to the segment CM (the perpendicular bisector of the segment CM) and the other of the second sewing lines 52 (right in FIG. 4) and the other of the third sewing lines 53 (right in FIG. 4) are line symmetrical with respect to the straight line passing over the point P and perpendicular to the segment DN (the perpendicular bisector of the segment DN), outer segments of the circumferential segments 31 outside the triangles AKI and BLJ can be lapped onto the receiving segments 36 being developed flat with the points M and N being lapped onto the points C and D, respectively.

Note that each of the angles $\alpha$, $\beta$, $\gamma$ and $\delta$ can be set separately. However, it is preferable that the angles are set as $\alpha=\beta=\gamma=\delta=0$. According to this setting, the point S is made identical to the point A. Similarly, the points G and Q are made identical to the point E. The point T is made identical to the point B. The points H and R are made identical to the point F. As a result, the two triangles AKI can be formed on a same flat plane and the two triangles BLJ can be formed on another same flat plane. And then the area, which is on the same side as the point M with respect to the straight line AI, of the circumferential-panel structure 41 can be folded along the straight line AE. The area, which is on the same side as the point N with respect to the straight line BJ, of the circumferential-panel structure 41 can be folded along the straight line BF. As a result, wrinkling on the airbag fabric 30 can be restrained and thereby the airbag can provide a good-looking. In addition, manufacturing efficiency can be improved further.

Subsequently, manufacturing method of the airbag main body 10 will be described.

(First Step)

Figure 5:
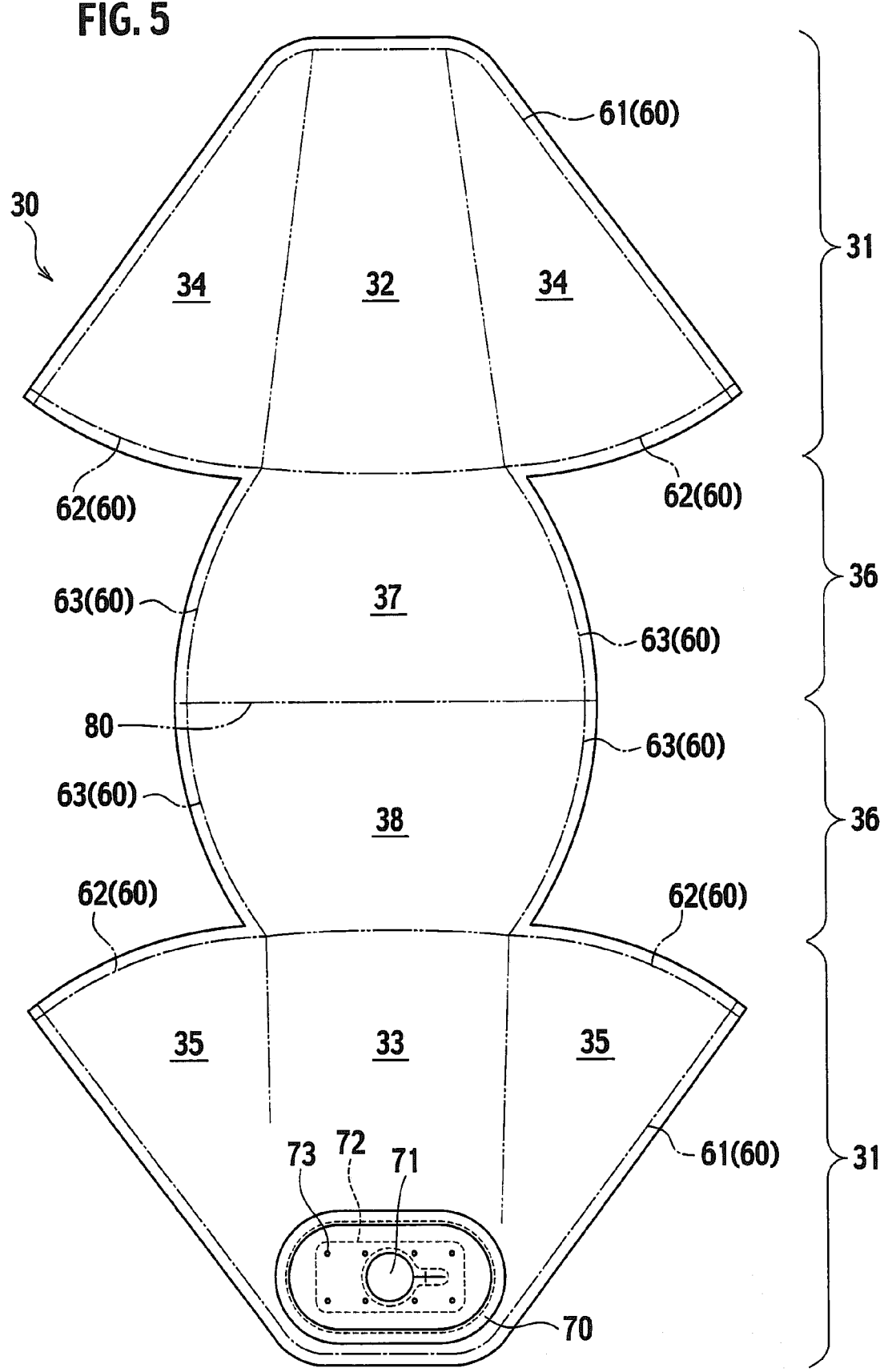
FIG. 5 is an extended plan view of the fabric of the airbag in the first embodiment.

First, the airbag fabric 30 shown in FIG. 5 is folded back along the virtual axial line 80 so as to lap a pair of to-be-sewn lines 60.

Note that the airbag fabric 30 shown in FIG. 5 is identical to that shown in FIG. 3 except for replacing the sewing lines 50 with the to-be-sewn lines 60. Namely, the to-be-sewn lines 60 includes first to-be-sewn lines 61, second to-be-sewn lines 62 and third to-be-sewn lines 63 which have the same shapes as the first sewing lines 51, and the second sewing lines 52 and the third sewing lines 53 of the sewing lines 50 described above, respectively.

(Second Step)

Figure 6:
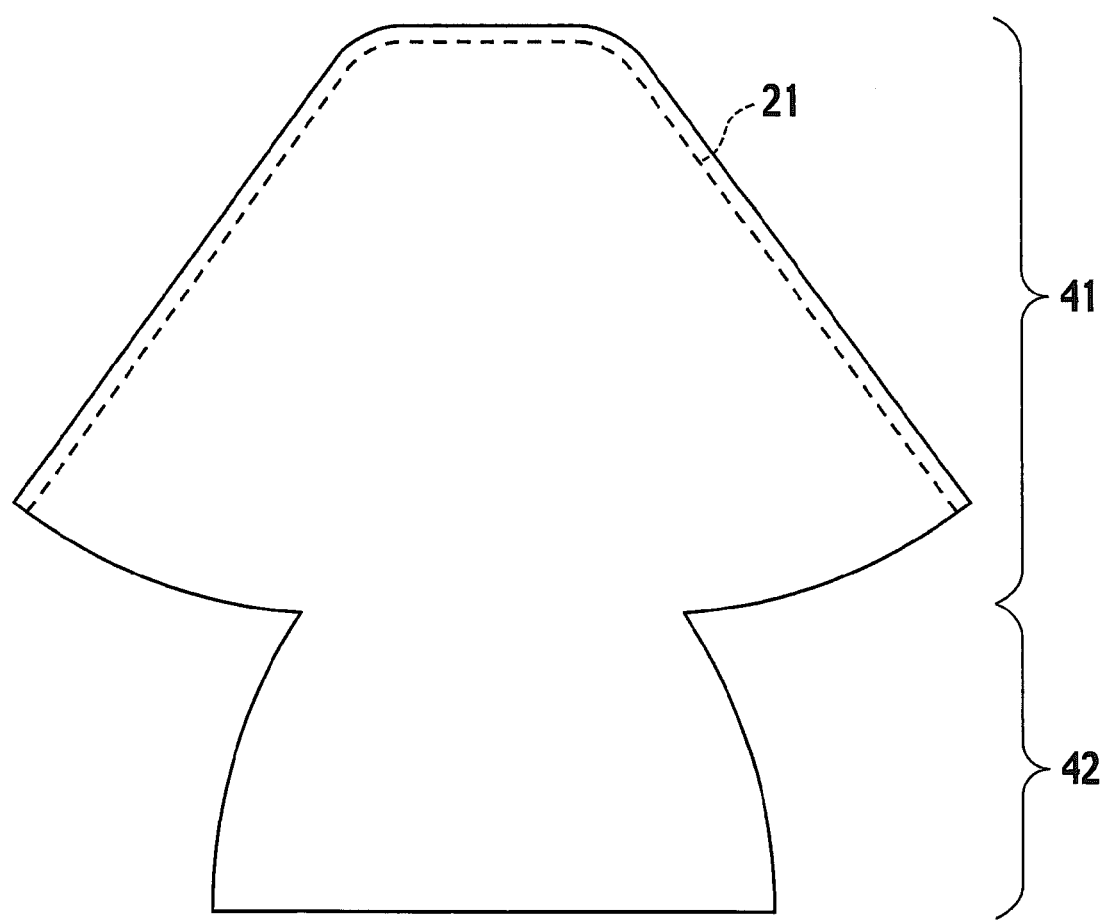
FIG. 6 is a plan view of the fabric of the airbag in the first embodiment after being sewn with a first thread.

Next, the pair of circumferential segments 31 (the one and the other of the circumferential segments 31) is sewn along the lapped first to-be-sewn lines 61 with the first thread 21. FIG. 6 shows this state.

(Third Step)

Figure 7:
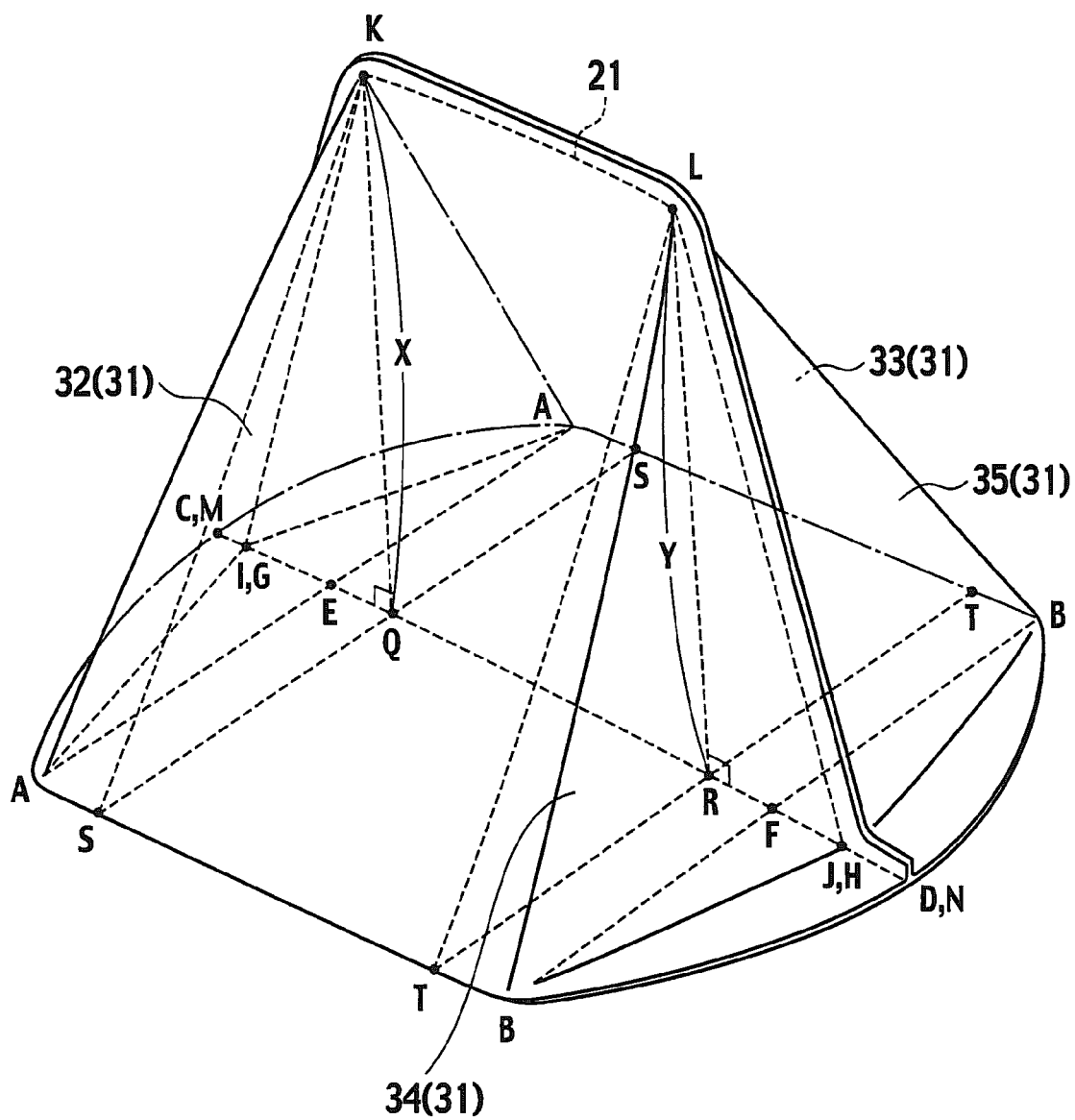
FIG. 7 is a perspective view of the fabric of the airbag in the first embodiment in a state in which the receiving panel is laid on a flat plane.

Subsequently, the one of the circumferential segments 31 (including the circumferential upper area 32) and the other of the circumferential segments 31 (including the circumferential lower area 33) are pulled oppositely so as to be separated each other and then the receiving segments 36 are made laid on a flat plane. One pair of the second to-be-sewn lines 62 on the one of the circumferential segments 31 (including the circumferential upper area 32) are lapped onto one pair of the third to-be-sewn lines 63 on the one of the receiving segments 36 (including the receiving upper area 37). Another pair of the second to-be-sewn lines 62 on the other of the circumferential segments 31 (including the circumferential lower area 33) are lapped onto another pair of the third to-be-sewn lines 63 on the other of the receiving segments 36 (including the receiving lower area 38). FIG. 7 shows this state.

(Fourth Step)

Figure 8:
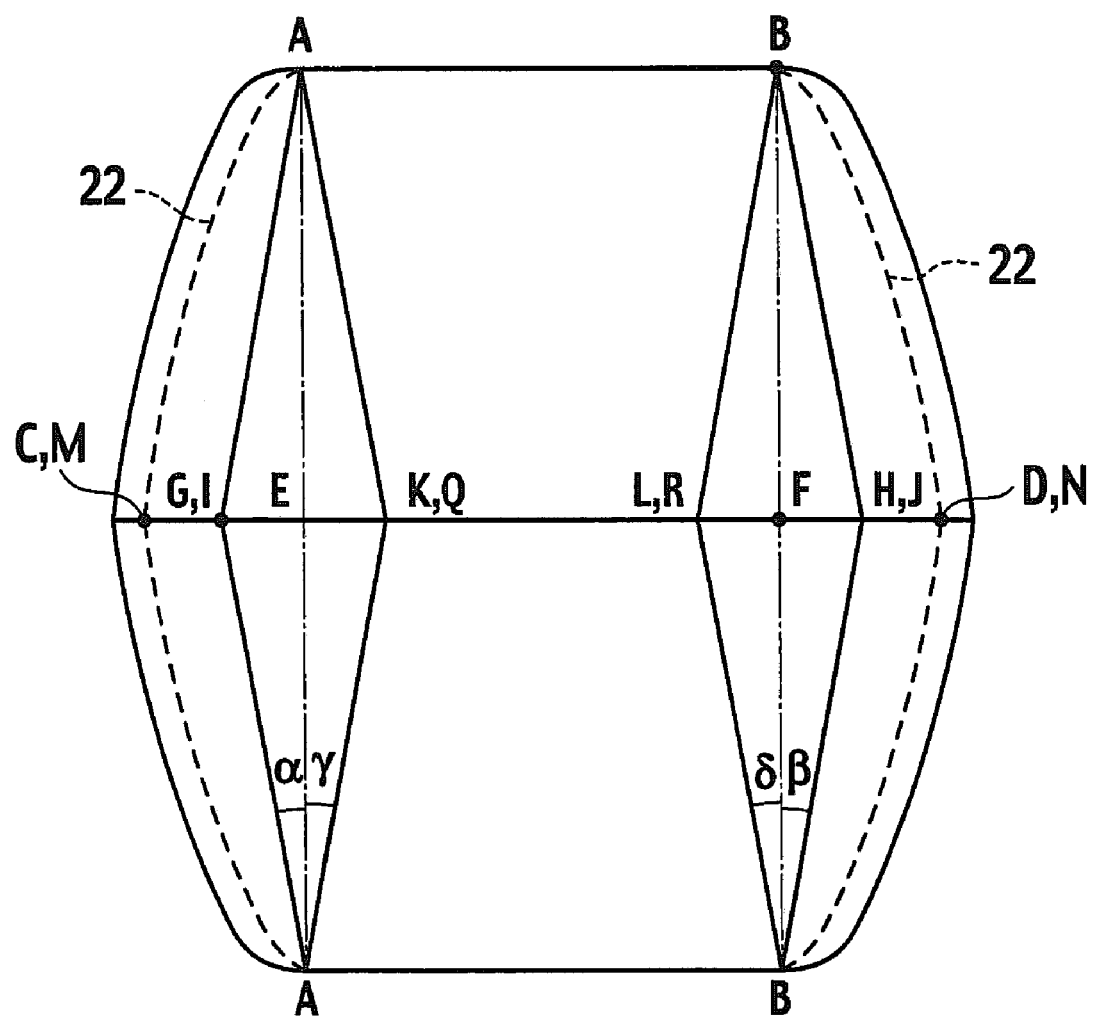
FIG. 8 is a plan view of the fabric of the airbag in the first embodiment after being sewn with a second thread.

Subsequently, edges of the segments 31 and 36 are sewn along the second to-be-sewn lines 62 with the second threads 22 so as to cross the first thread 21. The second threads 22 run from one pair of the points A and B, which are cross points of the second to-be-sewn lines 62 on the one of the circumferential segments 31 (including the circumferential upper area 32 and the third to-be-sewn lines 63 on the one of the receiving segments 36 (including the receiving upper area 37), to another pair of the points A and B, which are cross points of the second to-be-sewn lines 62 on the other of the circumferential segments 31 (including the circumferential lower area 33 and the third to-be-sewn lines 63 on the other of the receiving segments 36 (including the receiving lower area 38), respectively. FIG. 8 shows this state.

Lastly, an entire of the airbag fabric 30 are reversed through the opening 71 and then manufacturing of the airbag main body 10 is completed. Sewn edges of the airbag fabric 30 are hidden within the airbag main body 10.

According to the method in the present embodiment, the airbag main body 10 can be manufactured by repeating single process set of folding back the airbag fabric 30 and sewing the lapped to-be-sewn lines 60 only twice as described above. As a result, manufacturing efficiency of airbags can be improved.

Second Embodiment

Figure 9:
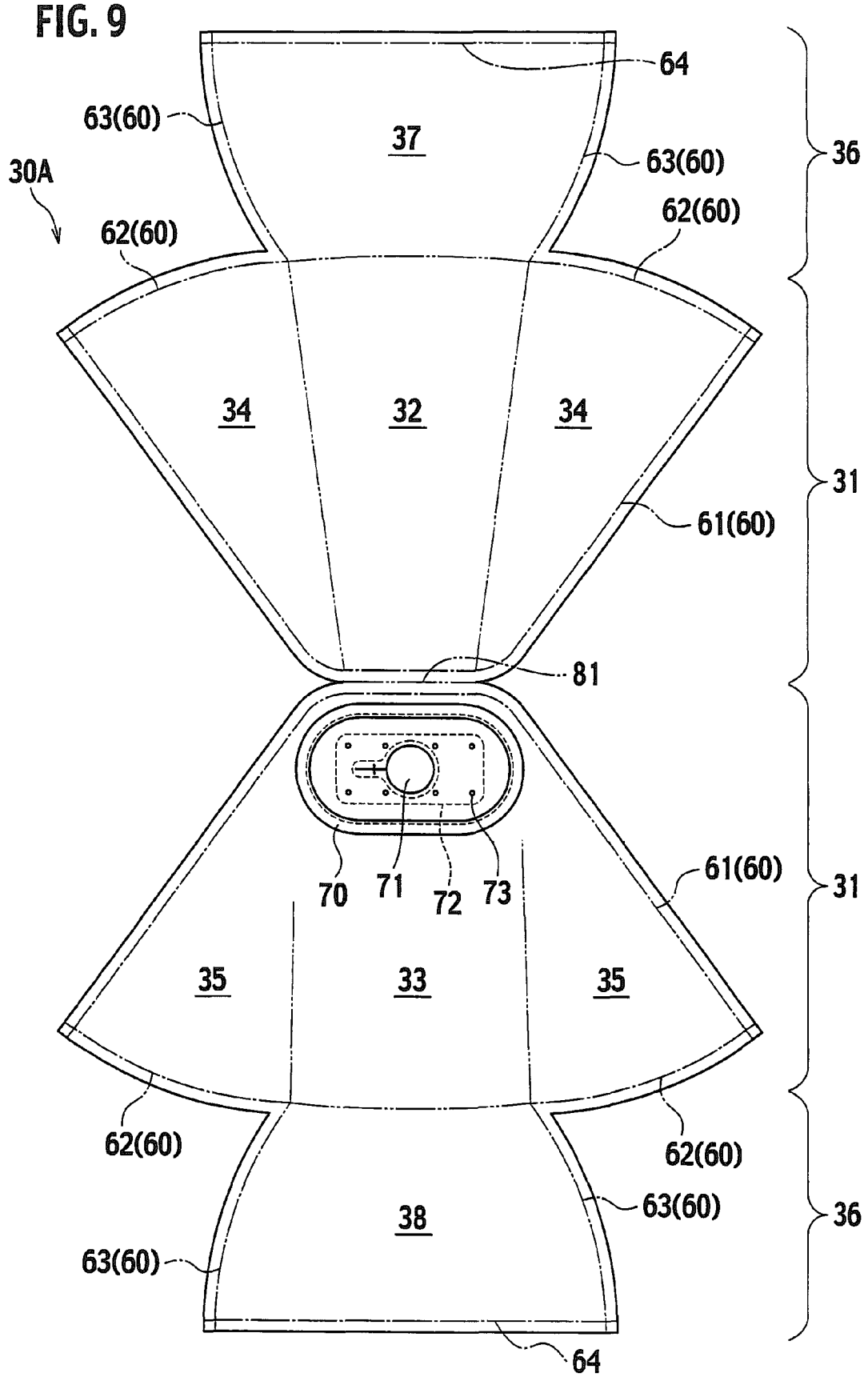
FIG. 9 is an extended plan view of an airbag fabric in a second embodiment according to the present invention.

FIG. 9 is an extended plan view of an airbag fabric 30A in the present embodiment. Note that, an airbag in the present invention includes some elements similar or identical to those in the first embodiment. Such elements are allocated identical numerals in order to omit their repetitive descriptions.

The airbag fabric 30A in the present embodiment has a pair of circumferential segments 31 is integrally extended on both sides of a virtual axial line 81. In addition, a receiving segment 36 is extended from each opposing edge of the circumferential segments 31 to the virtual axial line 81, respectively. This is an outstanding difference from the above-described first embodiment. Other configurations are basically identical to those in the above-described first embodiment.

Each of the receiving segments 36 has a to-be-sewn line 64. The to-be-sewn lines 64 are to be sewn together with being lapped.

In the present embodiment, the airbag fabric 30A is firstly folded back along the virtual axial line 81 and then sewn along the lapped to-be-sewn lines 64. Note that the lapped to-be-sewn lines 64 in the present embodiment correspond to the virtual axial line 80 in the first embodiment.

Following manufacturing (sewing) processes of the airbag main body 10 will be the same as those in the first embodiment.

The present embodiment can be achieved the same advantages as those achieved by the first embodiment.

Although preferable embodiments of the present invention have been described above, the present invention can take various modified configurations within a scope of the technical idea of the present invention.

For example, in the above embodiments, used is one sheet of the airbag fabric having the pair of circumferential segments and the pair of receiving segments which are integrally provided and extended. However, divided two sheets of airbag fabrics may be used. One sheet may have one of the circumferential segments and the pair of receiving segments, and another sheet may have another of the circumferential segments. Alternatively, one sheet may have the pair of circumferential segments and one of the receiving segments, and another sheet may have another of the receiving segments.

In addition, all the seam lines in the above-descrived airbag 1 are made by sewing with the threads. However, they may be made by adhesive joining, gluing or the like as shown in FIG.

Figure 10:
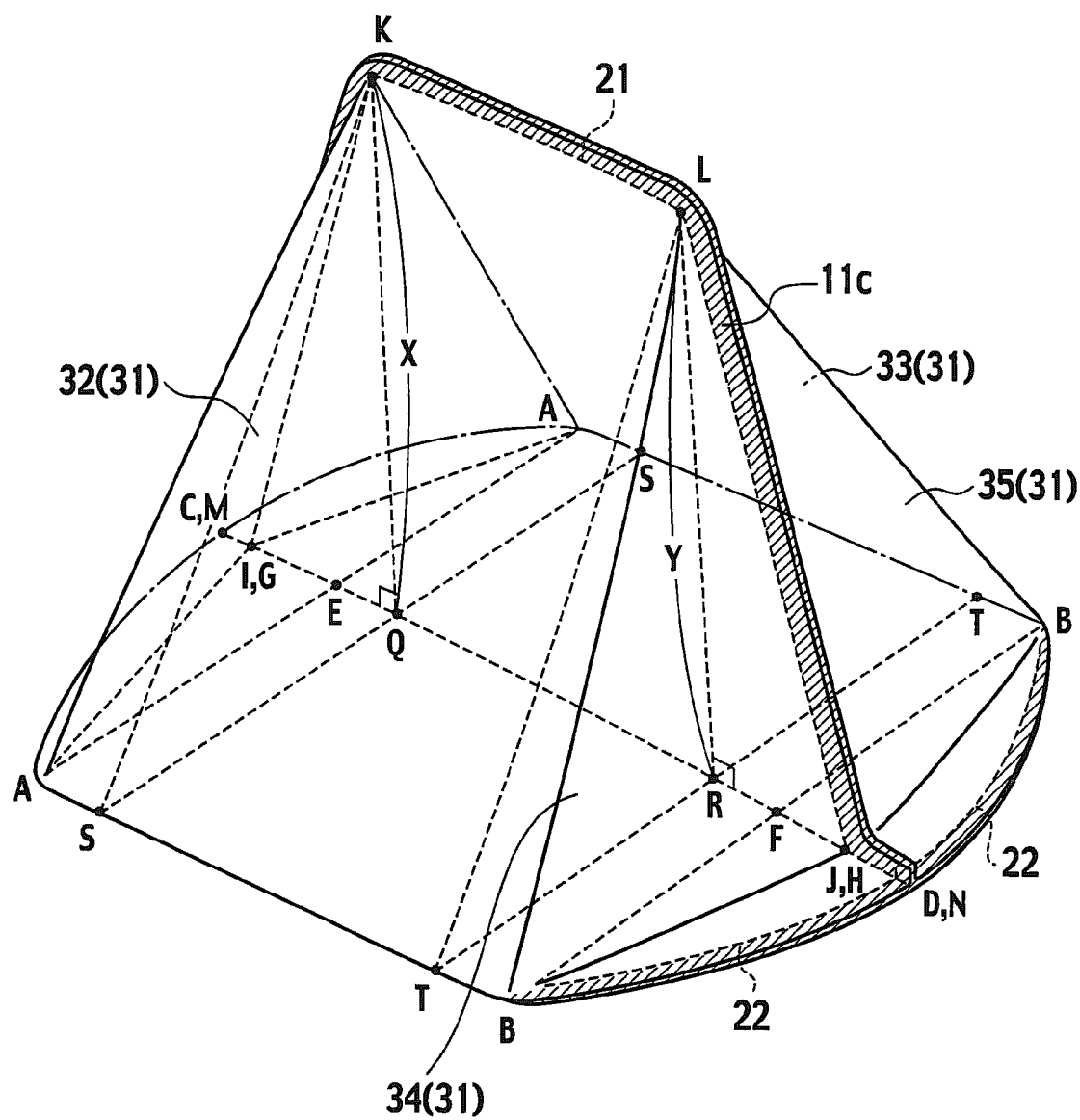
FIG. 10 is a perspective view of an airbag according to a second embodiment of the present invention.

10. Adhered or glued areas are indicated with hatchings in FIG. 10. And identical or similar elements to those in the above-described first embodiment are allocated with identical numerals to omit their redundant explanations.

Alternatively, it may be applicable that some seam lines are made by sewing and others are made by adhesive joining, gluing or the like. Further, sewing and adhesive joining (gluing or the like) may be applicable in combination at the same area.

Furthermore, in the above embodiments, explained is the airbag for a passenger's seat (the airbag is to be installed in front of the passenger's seat). However, the present invention is not limited to this and may be installed in front of a driver's seat.

What is claimed is:

1. An airbag comprising:
  a circumferential panel formed by being seamed along a first seam line from a base end to a farthest end;
  a margin provided on the circumferential panel for the first seam line;
  a receiving panel continuing with the circumferential panel for receiving a passenger;
  a second seam line for seaming the circumferential panel and the receiving panel together; and
  a main body including the circumferential panel, the margin, the receiving panel and the second seam line, wherein
  the second seam line crosses the first seam line and goes across the margin in a width direction of the margin,
  the main body being formed by seaming an airbag fabric, which includes a pair of circumferential segments for forming the circumferential panel and a pair of receiving segments for forming the receiving panel,
  the airbag fabric includes a pair of seamed lines which are lapped together and extend along the first and second seam lines when spread into a flat state,
  the airbag fabric, in a state where the pair of seamed lines have been lapped on each other, includes a double-layered circumferential-panel structure formed with the lapped circumferential segments and a double-layered receiving-panel structure adjacent to the circumferential-panel structure and formed with the lapped receiving segments,
  each of the seamed lines including:
    a first seamed line provided on the circumferential-panel structure, the lapped circumferential segments being seamed along the first seamed line to form the first seam line,
    a pair of second seamed lines provided on the circumferential-panel structure and crossing the first seamed line, one of the circumferential segments and one of the receiving segments being seamed along one of the second seamed lines to form the second seam line and another of the circumferential segments and another of the receiving segments being seamed along another of the second seamed lines to form the second seam line, and
    a pair of third seamed lines provided on the receiving-panel structure and crossing the pair of second seamed lines, respectively, the pair of third seamed lines being lapped onto the pair of second seamed lines, and
  the first seamed line and the pair of second seamed lines are located on or outside a circumference of a hexagon AIKLJB, and points M and N are located outside the hexagon AIKLJB; wherein:
    point A comprises a cross point of one set of the lapped second seamed lines and one set of the lapped third seamed lines,
    point B comprises a cross point of another set of the lapped second seamed lines and another set of the lapped third seamed lines,
    point C comprises a cross point of the one set of the lapped third seamed lines and a virtual axial line extending along a folding edge of the receiving-panel structure,
    point D comprises a cross point of the other set of the lapped third seamed lines and the virtual axial line,
    point E comprises a cross point of a segment CD and a straight line passing over the point A and perpendicular to a segment AB,
    point F comprises a cross point of the segment CD and a straight line passing over the point B and perpendicular to the segment AB,
    point G comprises a cross point of the segment CD and a straight line obtained by rotating a straight line AE around the point A by α degree,
    point H comprises a cross point of the segment CD and a straight line obtained by rotating a straight line BF around the point B by β degree,
    point I comprises a point being on an opposite side of the point B with respect to the straight line AE and providing a segment with the point A having the same length as a segment AG,
    point J comprises a point being on an opposite side of the point A with respect to the straight line BF and providing a segment with the point B having the same length as a segment BH,
    point K comprises a point to meet a following formula (I) on a straight line obtained by rotating the straight line AE around the point A by γ degree, $$(AI)^2 \times (\cos 2\alpha) = (AK)^2 - (IK)^2 + 2 \times (AI) \times (AK) \times (\sin \alpha) \times (\sin \gamma) \quad (I)$$

point L comprises a point to meet a following formula (II) on a straight line obtained by rotating the straight line BF around the point B by ø degree, $$(BJ)^2 \times (\cos 2\beta) = (BL)^2 - (JL)^2 + 2 \times (BJ) \times (BL) \times (\sin \beta) \times (\sin \text{ø}) \quad (II)$$

point M comprises: a cross point of the lapped first seamed lines and the one set of the lapped second seamed lines, and
    point N comprises a cross point of the lapped first seamed lines and the other set of the lapped second seamed lines.

2. A manufacturing method of an airbag according to claim 1 manufactured by seaming an airbag fabric along first and second seam lines, which includes a pair of circumferential segments for forming a circumferential panel and a pair of receiving segments for forming receiving panel, wherein
  the airbag fabric includes a pair of to-be-seamed lines which are to be lapped together,
  the airbag fabric, in a state where the pair of seamed lines has been lapped on each other, includes a double-layered circumferential-panel structure formed with the lapped circumferential segments and a double-layered receiving-panel structure adjacent to the circumferential-panel structure and formed with the lapped receiving segments,
  each of the to-be-seamed lines includes
    a first to-be-seamed line provided on the circumferential-panel structure, the lapped circumferential segments being seamed along the first seamed line to form the first seam line, a pair of second to-be-seamed lines provided on the circumferential-panel structure and crossing the first to-be-seamed line, one of the circumferential segments and one of the receiving segments being to be seamed along one of the second to-be-seamed lines to form the second seam line and another of the circumferential segments and another of the receiving segments being to be seamed along another of the second to-be-seamed lines to form the second seam line, and a pair of third to-be-seamed lines provided on the receiving-panel structure and crossing the pair of second to-be-seamed lines, respectively, the pair of third to-be-seamed lines being to be lapped onto the pair of second to-be-seamed lines, and the method comprising:

a first step for folding back the airbag fabric so as to lap the pair of to-be-seamed lines on each other, a second step for seaming one of the circumferential segments and another of the circumferential segments along the lapped first to-be-seamed lines to form the first seam line, a third step for pulling away the one of the circumferential segments and the other of the circumferential segments so as to make the pair of receiving segments laid on a same flat panel, and lapping the second to-be-seamed line on the one of the circumferential segments onto the third to-be-seamed line on the one of the receiving segments and lapping the second to-be-seamed line on the other of the circumferential segments onto the third to-be-seamed line on the other of the receiving segments, and a fourth step for seaming edges of the lapped circumferential and receiving segments along the second to-be-seamed lines to form the second seam line so as to cross the first seam line from cross points of the second to-be-seamed lines on the one of the circumferential segments to other cross points of the second to-be-seamed lines on the other of the circumferential segments, respectively.

* * * * *